(12) United States Patent
Lange et al.

(10) Patent No.: US 7,786,051 B2
(45) Date of Patent: Aug. 31, 2010

(54) METHOD OF PREVENTING OR REDUCING FLUID LOSS IN SUBTERRANEAN FORMATIONS

(75) Inventors: George Lange, Midland, TX (US);
Vibhas J. Pandey, Midland, TX (US);
Samih Alsyed, Sugar Land, TX (US);
Timothy Lesko, Novosbirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 679 days.

(21) Appl. No.: 11/567,757

(22) Filed: Dec. 7, 2006

(65) Prior Publication Data

US 2008/0139417 A1    Jun. 12, 2008

(51) Int. Cl.
*C09K 8/60* (2006.01)
*C09K 8/68* (2006.01)
*C23G 1/06* (2006.01)
*E21B 43/22* (2006.01)
*E21B 43/16* (2006.01)

(52) U.S. Cl. .................. 507/219; 507/260; 507/203; 507/266; 507/267; 166/282; 166/305.1

(58) Field of Classification Search ................ 507/219, 507/260, 203, 266, 267; 166/305.1, 282
See application file for complete search history.

(56) References Cited

U.S. PATENT DOCUMENTS

| | | | |
|---|---|---|---|
| 4,716,964 A * | 1/1988 | Erbstoesser et al. ......... 166/284 |
| 4,848,467 A | 7/1989 | Cantu | |
| 4,957,165 A | 9/1990 | Cantu | |
| 4,986,355 A | 1/1991 | Casad | |
| 5,027,899 A * | 7/1991 | Grubert ..................... 166/278 |
| 7,036,587 B2 | 5/2006 | Munoz, Jr. | |
| 7,066,260 B2 | 6/2006 | Sullivan | |
| 7,166,560 B2 | 1/2007 | Still | |
| 7,219,731 B2 | 5/2007 | Sullivan | |
| 2004/0106525 A1 | 6/2004 | Willberg | |
| 2004/0152601 A1 | 8/2004 | Still | |
| 2006/0042797 A1 | 3/2006 | Fredd | |
| 2006/0113077 A1 | 6/2006 | Willberg | |
| 2006/0169450 A1 | 8/2006 | Mang | |
| 2006/0229212 A1 | 10/2006 | Willberg | |
| 2006/0283595 A1 | 12/2006 | Santra | |
| 2008/0108524 A1* | 5/2008 | Willberg et al. ............. 507/225 |

FOREIGN PATENT DOCUMENTS

| | | |
|---|---|---|
| WO | 2004038176 A1 | 5/2004 |
| WO | 2005047643 A1 | 5/2005 |
| WO | 2005095755 A1 | 10/2005 |
| WO | 2006030383 A2 | 3/2006 |

OTHER PUBLICATIONS

U.S. Appl. No. 11/278,191, filed Mar. 31, 2006 entitled Self-Cleaning Well Control Fluid.

* cited by examiner

*Primary Examiner*—Timothy J. Kugel
*Assistant Examiner*—Atnaf Admasu
(74) *Attorney, Agent, or Firm*—David Cate; Rachel E. Greene; Robin Naua

(57) ABSTRACT

A method of treating a formation penetrated by a wellbore to reduce fluid loss to the formation is carried out by providing a quantity of water-degradable particles formed from a solid polymeric acid precursor having a number average molecular weight (Mn) of greater than 4000. A slurry of the particles is formed with a carrier fluid, which may be an aqueous fluid. The slurry is introduced into the formation through the wellbore at a pressure below the fracture pressure of the treated formation. A treating fluid is subsequently introduced into the formation through the wellbore. The water-degradable particles degrade by contacting the particles with a free aqueous fluid introduced into the formation through the wellbore. The water-degradable particles may have a particle size of from about 0.25 mm or less. The slurry may contain from about 0.01 kg/L to about 0.15 kg/L of the water degradable particles.

27 Claims, 1 Drawing Sheet

METHOD OF PREVENTING OR REDUCING FLUID LOSS IN SUBTERRANEAN FORMATIONS

BACKGROUND

The present invention relates to methods for controlling fluid loss in a subterranean formation.

Hydrocarbons (oil, condensate, and gas) are typically produced from wells that are drilled into the formations containing them. For a variety of reasons, such as inherently low permeability of the reservoirs or damage to the formation, such as caused by drilling and completion of the well, the flow of hydrocarbons into the well may be undesirably low. In such cases, the well may be "stimulated," for example by the introduction of fracturing or acidizing fluids.

In order to treat a formation efficiently, a fluid loss additive may first be introduced into the formation to prevent fluid leak off and to plug thief zones where treatment fluid may leak into the rock matrix or fractures of the formation. This is usually accomplished by pumping non-degradable materials such as silica flour, fine mesh proppant, mica and cellulose materials. Because these materials do not degrade, however, they may be difficult to remove or clean up after the desired treatment has been carried out. Remaining materials may cause permanent damage and reduce hydrocarbon production from the formation. Dissolvable materials such as rock salt or benzoic acid flakes have been used as a temporary diverting or fluid loss agent. The degradation rates of such materials are difficult to control, however.

Better methods for fluid diversion and controlling leak off of treatment fluids are therefore needed.

BRIEF DESCRIPTION OF THE DRAWINGS

For a more complete understanding of the present invention, and the advantages thereof, reference is now made to the following descriptions taken in conjunction with the accompanying FIGURES, in which.

SUMMARY

Figure 1:
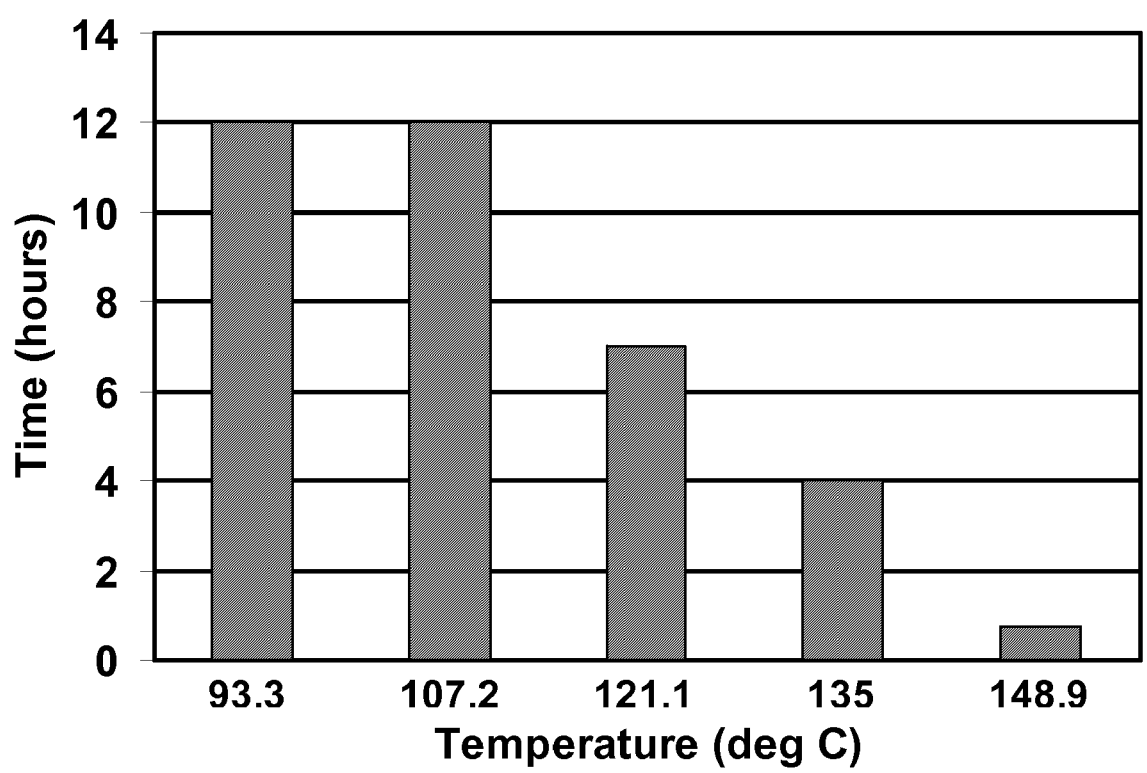
FIG. 1 is a graph illustrating hydrolysis rates of polylactic acid at various temperatures in the presence of excess calcium carbonate.

One embodiment of the invention is a method of treating a formation penetrated by a wellbore to reduce fluid loss to the formation. The method includes the steps of: (a) providing a quantity of water-degradable particles formed from a solid polymeric acid precursor having a number average molecular weight (Mn) of greater than 4000 g/mol; (b) forming a slurry of the particles with a carrier fluid; and (c) introducing the slurry of particles into the formation through the wellbore at a pressure below the fracture pressure of the treated formation; (d) subsequently introducing a treating fluid into the formation through the wellbore; and (e) allowing the water-degradable particles to degrade by contacting the particles by with an aqueous fluid introduced into the formation through the wellbore. In various aspects of this embodiment, the slurry contains from about 0.01 kg/L to about 0.15 kg/L of the water degradable particles; the slurry contains from about 0.01 kg/L to about 0.07 kg/L of the water degradable particles; the water-degradable particles are formed from a solid polymeric acid precursor having an average number molecular weight (Mn) of 50,000 g/mol or more; the water-degradable particles have a particle size of about 0.25 mm or less; the water-degradable particles are the sole particles within the carrier fluid; the aqueous fluid is at least one of the carrier fluid and the treating fluid; the water-degradable particles have a particle size of from about 0.14 mm to about 0.25 mm; the treating fluid is introduced at a pressure above the fracture pressure; and the water-degradable particles are formed from a solid polymeric acid precursor having a number average molecular weight (Mn) of about 50,000 g/mol to about 100,000 g/mol.

Another embodiment of the invention is a method of treating a formation penetrated by a wellbore to reduce fluid loss. The method includes the steps of: (a) providing a quantity of water-degradable particles having a particle size of about 0.25 mm or less; (b) forming a slurry of the particles with a carrier fluid, the slurry containing from about 0.01 kg/L to about 0.15 kg/L of the water degradable particles; (c) introducing the slurry of particles into the formation through the wellbore at a pressure below the fracture pressure of the treated formation; (d) subsequently introducing a treating fluid into the formation through the wellbore; and (e) allowing the water-degradable particles to degrade by contacting the particles with an aqueous fluid introduced into the formation through the wellbore. In various aspects of this embodiment, the slurry contains from about 0.01 kg/L to about 0.07 kg/L of the water degradable particles; the water-degradable particles are solid polymeric acid precursor particles; the solid polymeric acid precursor includes at least one of lactide, glycolide, polylactide, polyglycolide, copolymers of polylactic acid and polyglycolic acid, copolymers of lactic acid and other hydroxy acids, copolymers of glycolic acid and other hydroxyl acids, and combinations and mixtures thereof; the water-degradable particles are the sole particles within the carrier fluid; the aqueous fluid is at least one of the carrier fluid and the treating fluid; the water-degradable particles have a particle size of from about 0.14 mm to about 0.25 mm; the treating fluid is introduced at a pressure above the fracture pressure; and the water-degradable particles are formed from solid polymeric acid precursor materials having a number average molecular weight (Mn) of greater than about 50,000 g/mol

DETAILED DESCRIPTION

By using water-degrading materials that can be pumped into a formation, temporary diversion and reduction of fluid loss to the subterranean formation can be achieved.

In particular, the water-degrading materials include solid polymeric acid precursor particles. These may be solid polymers of certain organic acids that hydrolyze or depolymerize under known and controllable conditions of temperature, time and pH to form their monomeric organic acids. As used herein, these materials are referred to as "solid polymeric acid precursors." These materials are typically solids at room temperature.

Many of these polymers are essentially linear. The degree of polymerization of the linear polylactic acid, for example, can vary from a few units (e.g. 2-10) (oligomers) to several thousands (e.g. 2000-5000). The polymers may also include some cyclic structures, including cyclic dimers. In general, the degree of polymerization of these cyclic structures is smaller than that of the linear polymers.

It should be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified)

and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor appreciate and understand that any and all data points within the range are to be considered to have been specified, and that the inventors have possession of the entire range and all points within the range.

The polymeric acid precursor materials include the polymers and oligomers that hydrolyze or degrade in certain chemical environments under known and controllable conditions of temperature, time and pH to release organic acid molecules that, as in the foregoing, are referred to as "monomeric organic acids." As used herein, the expression "monomeric organic acid" or "monomeric acid" may also include dimeric acid or acid with a small number of linked monomer units that function similarly, for purposes of the invention described herein, to monomer acids composed of only one monomer unit.

Polymer materials may include those polyesters obtained by polymerization of hydroxycarboxylic acids, such as the aliphatic polyesters respectively of lactic acid, referred to as polylactic acid; glycolic acid, referred to as polyglycolic acid; 3-hydroxbutyric acid, referred to as polyhydroxybutyrate; 2-hydroxyvaleric acid, referred to as polyhydroxyvalerate; epsilon caprolactone, referred to as polyepsilon caprolactone; or polycarbonate; the polyesters obtained by esterification of hydroxylaminoacids such as serine, threonine and tyrosine; and the copolymers obtained by mixtures of the monomers listed above. A general structure for the above-described homopolyesters is:

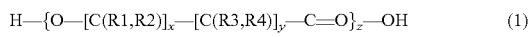

$$H\text{—}\{O\text{—}[C(R1,R2)]_x\text{—}[C(R3,R4)]_y\text{—}C\text{=}O\}_z\text{—}OH \quad (1)$$

where,

R1, R2, R3, R4 is either H, linear alkyl, such as $CH_3$, $CH_2CH_3$, $(CH_2)_nCH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);

x is an integer between 1 and 11;

y is an integer between 0 and 10; and z is an integer between 2 and 50,000.

Under the appropriate conditions (pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355, hereby incorporated by reference in their entirety.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids, the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number average molecular weights (Mn) of up to about 100,000 and weight average molecular weights (Mw) of up to about 200,000, although any polylactide (made by any process by any manufacturer) may be used. Those available from Nature-Works, LLC typically have crystalline melt temperatures of from about 120 to about 170° C., but others are obtainable. Poly(D,L-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly(lactide-co-glycolide).

The extent of the crystallinity can be controlled by the manufacturing method for homopolymers and by the manufacturing method and the ratio and distribution, for example of lactide and glycolide, for the copolymers. Additionally, the chirality of the lactic acid used also affects the crystallinity of the polymer. Polyglycolide can be made in a porous form. Some of the polymers dissolve very slowly in water before they hydrolyze.

An example of a suitable commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acid derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terphthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; and dicarboxylic acid halides, primarily dicarboxylic acid chlorides, such as propanedioic acyl chloride, malonyl chloride, fumaroyl chloride, maleyl chloride, succinyl chloride, glutaroyl chloride, adipoyl chloride, and phthaloyl chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); and polyols such as glycerol. When both a dicarboxylic acid derivative and a dihydroxy compound are used, a linear polyester results. It is understood that when one type of dicarboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular example, not intended to be comprehensive of all the possible polyester structures one can consider, but just to provide an indication of the general structure of the most simple case one can encounter, the general structure for the linear homopolyesters of the invention is:

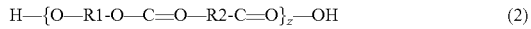
(2)

where,

R1 and R2, are linear alkyl, branched alkyl, aryl, alkylaryl groups; and z is an integer between 2 and 50,000.

Other examples of suitable polymeric acid precursors are the polyesters derived from phthalic acid derivatives such as polyethylenetherephthalate (PET), polybutylentherephthalate (PBT), polyethylenenaphthalate (PEN), and the like.

Under the appropriate conditions (pH, temperature, water content) polyesters like those described herein can "hydrolyze" and "degrade" to yield polycarboxylic acids and polyhydroxy compounds, regardless of the original polyester being synthesized from either one of the polycarboxylic acid derivatives listed above. The polycarboxylic acid compounds that the polymer degradation process will yield are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

The rates of the hydrolysis reactions of all these materials are governed by the molecular weight, the crystallinity (the ratio of crystalline to amorphous material), the physical form (size and shape of the solid), and in the case of polylactide, the amounts of the two optical isomers. Some of the polymers dissolve very slowly in water before they hydrolyze. (The naturally occurring L-lactide forms partially crystalline polymers; synthetic D,L-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

In the present invention, solid polymeric acid precursors having number average molecular weights (Mn) of greater than 4000 g/mol, 5000 g/mol, 10,000 g/mol, 20,000 g/mol, 50,000 g/mol, 100,000 g/mol or more may be used. In particular, those solid polymeric acid precursors having number average molecular weights of (Mn) of from about 50,000 g/mol or 60,000 g/mol to about 100,000 g/mol or more with a weight average molecular weight (Mw) of from about 100,000 g/mol to about 200,000 g/mol or more are particularly well suited for the present invention. The higher molecular weights result in slower hydrolysis, which allows an aqueous carrier fluid to be used with the water-degrading particles.

Degradation times may vary and the water-degradable particles may be selected to provide a desired degradation rate, which may be dependent upon the formation temperature and other conditions. Typical degradation times for many applications may range from less than an hour to 12 hours or more. In particular, at 200° F. (93.3° C.), which is a typical formation temperature, the particles may substantially degrade in about 4 to 6 hours to as much as 12 hours or more in an aqueous fluid. At 300° F. (148.9° C.) the same particles may substantially degrade in about one hour or less.

The solid polymer acid precursor particles are granular particles or in the form of powder. The particles may have a generally spherical configuration or be granular. Other shapes or configurations may be used, as well; however, fibers and similar elongated shapes for the solid acid polymer precursor materials do not form a part of the present invention. The particles may have a particle size (for example a diameter, if spherical) of from about 0.85 mm or less. In certain applications, particles larger than 0.85 mm may be used. In many applications, however, smaller particles are used. In particular, the particles may have a particle size of from about 0.14 mm to about 0.25 mm.

The solid polymeric acid precursor materials may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid polymeric acid precursors or the mixtures of solid polymeric acid precursors by any means delays the hydrolysis. Note that coating here may refer to encapsulation or simply to changing the surface by chemical reaction or by forming or adding a thin film of another material. Another suitable method of delaying the hydrolysis of the solid polymeric acid precursor, and the release of acid, is to suspend the solid polymeric acid precursor, optionally with a hydrophobic coating, in an oil or in the oil phase of an emulsion. The hydrolysis and acid release do not occur until water contacts the solid polymeric acid precursor. Methods used to delay hydrolysis may be used in conjunction with inclusion of, for example, solid acid-reactive material to degrade the polymeric acid precursor because it may be desirable to delay degradation but then to degrade the polymer rapidly.

It has been found that dissolution of the solid polymeric acid precursors may be accelerated by the addition of certain chemical agents. These agents react readily with the solid polymeric acid precursor and cause the removal of a small amount of material from the solid polymeric acid precursor surface. Not to be limited by theory, but it is believed that an intact surface of the solid polymeric acid precursor is comparatively insoluble, but that when the surface is disrupted by the removal of a small amount of material subsequent dissolution of additional material from that surface is easier. Only a small amount of the accelerating agent ("accelerant") is necessary to start the dissolution process; thereafter it will proceed without any added agent. On the other hand, if there is additional agent present, since it reacts readily with the solid polymeric acid precursor it will accelerate the continuing dissolution process. This is the "accelerant" mechanism. Note that the accelerant may not consume all of the acid generated, but may cause more rapid degradation of the polymer by disrupting the solid polymeric acid precursor surface structure. If the agent is a solid, it cannot accelerate the initial dissolution because there is inadequate chemical interaction between the two solids, but once the dissolution of the solid polymeric acid precursor starts (for example as a result of an increase in temperature in an aqueous environment) solid acid-reactive material will accelerate subsequent dissolution. Note that the formation itself can be a solid accelerant. Furthermore, the action of accelerants may be delayed, for example, if they are slowly soluble solids or if they are chemically bound in a liquid chemical that must be hydrolyzed to release the agent. One solid polymeric acid precursor may be an accelerant for another; for example, PGA accelerates the hydrolysis of PLA. The timing and rate of dissolution of the solid polymeric acid precursor is controlled by these techniques.

To accelerate the dissolution of solid polymeric acid precursors, water-insoluble solid acid-soluble or acid-reactive materials, such as but not limited to magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, may be mixed with or incorporated into, solid polymeric acid precursors, such as cyclic ester dimers of lactic acid or glycolic acid or homopolymers or copolymers of lactic acid or glycolic acid. These mixtures may be added to a fracturing fluid or other treating fluid. At least a portion of the solid polymeric acid precursor slowly hydrolyzes at controllable rates to degrade at pre-selected locations and times in the formation. The dissolved solid polymeric acid precursors will form acids that may react with the formation faces, which may be beneficial. The acids may also react with and dissolve at least a portion of the acid-reactive materials, if they are present. This will accelerate the dissolution of the solid polymeric acid precursor and generate acid in amounts beyond that which reacts with the solid acid-reactive material. The result is that at least a portion of both the solid polymeric acid precursor and the acid-reactive solid material dissolve. Usually most or all of the solid material initially added is no longer present at the end of the treatment. Note that often the additional solid acid-reactive material will not be needed to accelerate the hydrolysis of the solid polymeric acid precursor, because the formation itself will be acid-reactive. However, the solid acid-reactive material may be selected to be more reactive than the formation or may be in more intimate contact with the solid polymeric acid precursor.

Mixtures of one or more solid polymeric acid precursors and one or more solid acid-reactive materials, if they are present, may be purely physical mixtures of separate particles of the separate components. The mixtures may also be manufactured such that one or more solid polymeric acid precursors and one or more solid acid-reactive materials are in each particle; this will be termed a "combined mixture". This may be done, for example, by coating the acid-reactive material with the solid polymeric acid precursor, or by heating a physical mixture until the solid polymeric acid precursor melts, mixing thoroughly, cooling, and comminuting. Such mixtures of polymers and solids are commonly referred to as "filled polymers". In any case the distribution of the components in the mixtures may be as uniform as possible. The choices and relative amounts of the components may be adjusted for the situation to control the solid polymeric acid precursor hydrolysis rate. This may depend upon the temperature at which the treatment will be carried out, the composition of the aqueous fluid or fluids with which the mixture will come into contact, and the time and rate desired for degradation of the polymer. The combined mixture or filled polymers that contain both the solid polymeric acid precursor and the acid-soluble particulate material, may be formed, for example, by co-extruding mixtures of the materials. Calcium carbonate (or other solid acid-reactive materials) coated with solid polymeric acid precursor may also be used.

The dissolution of solid polymeric acid precursors may also be accelerated by the addition of certain soluble liquid additives. These may be included or present in subsequently introduced treating fluids or may be added specifically for accelerating the polymer degradation. These accelerants may be acids, bases, or sources of acids or bases. These are particularly useful at low temperatures (for example below about 135° F. (57.2° C.)), at which the solid polymeric acid precursors hydrolyze slowly, relative, for example, to the time an operator would like to put a well on production after a fracturing treatment. Non-limiting examples of such soluble liquid additives that hydrolyze to release organic acids are esters (including cyclic esters), diesters, anhydrides, lactones and amides. A compound of this type, and the proper amount, that hydrolyzes at the appropriate rate for the temperature of the formation and the pH of the treating fluid is readily identified for a given treatment by simple laboratory hydrolysis experiments. Other suitable soluble liquid additives are simple bases. (They are termed "liquids" because in practice it would be simpler and safer to add them to the fluids as aqueous solutions rather than as solids.) Suitable bases are sodium hydroxide, potassium hydroxide, and ammonium hydroxide. Other suitable soluble liquid additives are alkoxides, water-soluble carbonates and bicarbonates, alcohols such as but not limited to methanol and ethanol, alkanol amines and organic amines such as monoethanol amine and methyl amine. Other suitable soluble liquid additives are acids, such as but not limited to hydrochloric acid, hydrofluoric acid, ammonium bifluoride, formic acid, acetic acid, lactic acid, glycolic acid, aminopolycarboxylic acids (such as but not limited to hydroxyethyliminodiacetic acid), polyaminopolycarboxylic acids (such as but not limited to hydroxyethylethylenediaminetriacetic acid), salts—including partial salts—of the organic acids (for example, ammonium, potassium or sodium salts), and mixtures of these acids or salts. (Ammonium bifluoride partially hydrolyzes in contact with water to form some HF, and so will be called an acid here.) The organic acids may be used as their salts. When corrosive acid might contact corrodible metal, corrosion inhibitors may be added.

The solid polymeric acid precursor particles, with or without any incorporated accelerant or delay coating, are combined with a carrier fluid to form a slurry. The carrier fluid may be any fluid having properties that allow the water-degradable materials to be transported therein. Examples of suitable carrier fluids may include water, oil, viscosified water (such as water based guar, modified guar gel crosslinked with borate or organometallic compounds, or water viscosified with a viscoelastic surfactant, for example one that forms micelles), viscosified oil, emulsions, crosslinked, energized fluids (with nitrogen or $CO_2$ gas) and slick water (water containing a small amount of polymer or viscoelastic surfactant that serves primarily as a friction reducer rather than primarily as a viscosifier). The properties of the carrier fluid may be modified, for example through the use of gelling agents, pH adjustors or the addition of breakers to provide the desired characteristics.

In certain instances, the carrier fluid is capable of degrading the particles itself and may include accelerants. In particular, an aqueous fluid is used as the carrier fluid so that it serves to degrade the water-degradable material alone or in combination with other fluids found or introduced into the formation. The carrier fluid may initially be at a low temperature where the degradation of the solid polymeric acid precursor occurs slowly. Upon placement of the slurry of the carrier fluid and solid polymeric acid precursor particles within the formation, the elevated temperature of the formation may facilitate the accelerated hydrolysis of the polymeric acid precursor.

In the present invention, while the water-degradable particles, filled or non-filled, may be used with other non-degradable particles or non-water-degradable particles, they are typically used by themselves without any other particulate materials. This is due to the temporary nature of the fluid loss treatment and to facilitate clean up of the solid materials so that they do not permanently damage or unnecessarily plug the formation. The water-degradable particles may be used at a concentration in the carrier fluid of from about 0.01 kg/L to about 0.15 kg/L, more particularly from about 0.01 kg/L to about 0.07 kg/L.

For a given treatment, the appropriate solid polymeric acid precursor, with or without any solid acid-reactive material, may be selected readily from among many available materials. The rate of degradation from a particular solid polymeric acid precursor or a particular mixture of a solid polymeric acid precursor and a solid acid-reactive material, having a particular chemical and physical make-up, including a coating if present, at a particular temperature and in contact with a fluid or fluids of a particular composition (for example pH and the concentration and nature of other components, especially electrolytes) may be determined by exposing the solid polymeric acid precursor to the fluid or fluids under treatment conditions and monitoring the polymer degradation.

The rate of solid acid-reactive material dissolution, if the solid acid-reactive material is included, is governed by similar factors (such as by the choice of solid acid-reactive material, the ratio of materials, the particle size, calcining and coating of solid acid-reactive material) and may readily and easily be determined by similar experiments. Naturally, a solid polymeric acid precursor is selected that a) degrades at the desired rate (after a suitable delay if needed) and b) is compatible with and does not interfere significantly with the function of other components of the treating fluids. An acid-reactive material may be selected that accelerates degradation to a suitable extent and is compatible with the function of other treatment fluids.

In treating a formation, the slurry of the solid polymeric acid precursor particles and carrier fluid is introduced through the wellbore and into the formation at a pressure that is below the fracture pressure of the formation or zone of the formation being treated. Various formations may be treated, including for example, carbonate, shale, sandstone, chalk, etc. The slurry is introduced into the formation while the pressure is being monitored. When the pressure rises to a preselected level, indicating that fluid thief zones have been plugged, pumping of the slurry containing the water-degradable particles may be stopped.

After introduction of the water-degradable material, treatment of the formation with a subsequent fluid may then be initiated. Subsequent treatments may include fracturing and acidizing treatments, as well as other treatments. These may include conventional fracturing treatments, acid fracturing and matrix acidizing, including treatment with organic acids and inorganic acids (e.g. HF), solvent treatments, drilling mud treatments, scale removal treatments, permanent squeezing/abandoning of formation zones, etc. Use of the water-degradable material has particular use in combination with subsequent acid fracturing and matrix acidizing treatments. As discussed previously, the subsequent treatment fluid may contain materials that accelerate or delay the degradation of the solid polymeric acid precursor materials, such as acids and bases, etc.

The solid polymeric acid-precursor materials eventually dissolve or degrade, providing temporary fluid diversion and/or temporary plugging of fluid loss zones. The aqueous fluids of the carrier fluid and/or subsequent treatment fluids eventually cause the water-degradable materials to degrade or hydrolyze to their monomeric acids, so that they are readily removed with fluid flow back and normal production of hydrocarbons. There is no permanent damage to the formation.

The following example serves to illustrate the invention further:

EXAMPLE 1

Polylactic acid particles provided by NatureWorks LLC, Minnetonka, Minn. having a particle size of 20/40 mesh (0.84 mm/0.42 mm) were hydrolyzed. To determine hydrolysis rate in the presence of carbonate, 45 grams of the small PLA beads were placed in a modified Parr 4500 series pressure reactor (Parr Instrument Company, Moline, Ill., U.S.A.). The 1-liter vessel and all internal components were made of Hastelloy B. To prevent reaction with the metal surface of the reactor, all solutions tested in the reactor were contained within a secondary PTFE cup. The solutions were stirred using a 4-blade impeller driven by a magnetic drive-coupled electrical motor. The cell also was fitted with a dip tube to remove samples and a backpressure regulator. 500 ml of DI water and 70 grams of calcium carbonate (powdered or 1 cm agglomerates) were added. The system was pressurized to 250-300 psi with N2, then heated to the target temperature and stirred at 100 rpm for a specified duration. At the end of the test, the sample was taken out and the amount of PLA remaining was noted. Full hydrolysis was defined as the time when no PLA remained in the reaction vessel. The hydrolysis rates presented in FIG. 1 were obtained. The final pH of these solutions was neutral (pH 5-7), indicating that the developed acid was able to react completely with the excess calcite. Calcium ion concentrations in these solutions averaged 23,000 mg/L (ppm).

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a formation penetrated by a wellbore to reduce fluid loss to the formation, the method comprising:
    providing a quantity of water-degradable particles formed from a solid polymeric acid precursor having a number average molecular weight (Mn) of greater than 4000 g/mol;
    forming a slurry of the particles with a carrier fluid;
    introducing the slurry of particles into the formation through the wellbore at a pressure below the fracture pressure of the treated formation;
    subsequently introducing a treating fluid into the formation through the wellbore; and
    allowing the water-degradable particles to degrade by contacting the particles with an aqueous fluid introduced into the formation through the wellbore.

2. The method of claim 1, wherein: the slurry contains from about 0.01 kg/L to about 0.15 kg/L of the water degradable particles.

3. The method of claim 1, wherein: the slurry contains from about 0.01 kg/L to about 0.07 kg/L of the water degradable particles.

4. The method of claim 1, wherein: the water-degradable particles are formed from a solid polymeric acid precursor having an average number molecular weight (Mn) of 50,000 g/mol or more.

5. The method of claim 1, wherein: the water-degradable particles have a particle size of about 0.25 mm or less.

6. The method of claim 1, wherein: the water-degradable particles are the sole particles within the carrier fluid.

7. The method of claim 1, wherein: the aqueous fluid is at least one of the carrier fluid and the treating fluid.

8. The method of claim 1, wherein: the water-degradable particles have a particle size of from about 0.14 mm to about 0.25 mm.

9. The method of claim 1, wherein: the treating fluid is introduced at a pressure above the fracture pressure.

10. The method of claim 1, wherein: the water-degradable particles are formed from a solid polymeric acid precursor having a number average molecular weight (Mn) of about 50,000 g/mol to about 100,000 g/mol.

11. A method of treating a formation penetrated by a wellbore to reduce fluid loss, the method comprising:
    providing a quantity of water-degradable particles having a particle size of about 0.25 mm or less;
    forming a slurry of the particles with a carrier fluid, the slurry containing from about 0.01 kg/L to about 0.15 kg/L of the water degradable particles;
    introducing the slurry of particles into the formation through the wellbore at a pressure below the fracture pressure of the treated formation;
    subsequently introducing a treating fluid into the formation through the wellbore; and
    allowing the water-degradable particles to degrade by contacting the particles with an aqueous fluid introduced into the formation through the wellbore.

12. The method of claim 11, wherein: the slurry contains from about 0.01 kg/L to about 0.07 kg/L of the water degradable particles.

13. The method of claim 11, wherein: the water-degradable particles are solid polymeric acid precursor particles.

14. The method of claim 13, wherein: the solid polymeric acid precursor includes at least one of lactide, glycolide, polylactide, polyglycolide, copolymers of polylactic acid and polyglycolic acid, copolymers of lactic acid and other hydroxy acids, copolymers of glycolic acid and other hydroxyl acids, and combinations and mixtures thereof.

15. The method of claim 11, wherein: the water-degradable particles are the sole particles within the carrier fluid.

16. The method of claim 11, wherein: the aqueous fluid is at least one of the carrier fluid and the treating fluid.

17. The method of claim 11, wherein: the water-degradable particles have a particle size of from about 0.14 mm to about 0.25 mm.

18. The method of claim 11, wherein: the treating fluid is introduced at a pressure above the fracture pressure.

19. The method of claim 11, wherein: the water-degradable particles are formed from solid polymeric acid precursor materials having a number average molecular weight (Mn) of greater than about 50,000 g/mol.

20. The method of claim 1, wherein the carrier fluid comprises water; oil; viscosified water; viscosified oil; emulsions; energized fluids; water containing a small amount of polymer or viscoelastic surfactant that serves primarily as a friction reducer rather than primarily as a viscosifier; or a combination thereof.

21. The method of claim 20, wherein the viscosified water comprises water based guar, modified guar gel, a viscoelastic surfactant, or a combination thereof.

22. The method of claim 1, wherein the carrier fluid comprises gelling agents, pH adjustors or the addition of breakers.

23. The method of claim 1, wherein the carrier fluid is an energized fluid.

24. The method of claim 11, wherein the carrier fluid comprises water; oil; viscosified water; viscosified oil; emulsions; energized fluids; water containing a small amount of polymer or viscoelastic surfactant that serves primarily as a friction reducer rather than primarily as a viscosifier; or a combination thereof.

25. The method of claim 24, wherein the viscosified water comprises water based guar, modified guar gel, a viscoelastic surfactant, or a combination thereof.

26. The method of claim 11, wherein the carrier fluid comprises gelling agents, pH adjustors or the addition of breakers.

27. The method of claim 11, wherein the carrier fluid is an energized fluid.

* * * * *